United States Patent
Sagou et al.

(10) Patent No.: US 9,873,309 B2
(45) Date of Patent: Jan. 23, 2018

(54) RADIANT HEATER AIR-CONDITIONING SYSTEM

(71) Applicant: DENSO CORPORATION, Kariya, Aichi-pref. (JP)

(72) Inventors: Yasuhiro Sagou, Chiryu (JP); Koji Ota, Kariya (JP); Asami Okamoto, Kariya (JP); Manabu Maeda, Nagoya (JP); Takuya Kataoka, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 113 days.

(21) Appl. No.: 14/782,853

(22) PCT Filed: Mar. 12, 2014

(86) PCT No.: PCT/JP2014/001392
§ 371 (c)(1),
(2) Date: Oct. 7, 2015

(87) PCT Pub. No.: WO2014/167774
PCT Pub. Date: Oct. 16, 2014

(65) Prior Publication Data
US 2016/0068044 A1 Mar. 10, 2016

(30) Foreign Application Priority Data
Apr. 12, 2013 (JP) .................................. 2013-084352

(51) Int. Cl.
*B60H 1/00* (2006.01)
*B60H 1/22* (2006.01)
(Continued)

(52) U.S. Cl.
CPC ......... *B60H 1/2218* (2013.01); *B60H 1/2215* (2013.01); *H05B 1/0236* (2013.01);
(Continued)

(58) Field of Classification Search
CPC .. B60H 1/2218; B60H 1/2215; B60H 1/2225; B60H 1/00285; B60H 1/0065;
(Continued)

(56) References Cited

U.S. PATENT DOCUMENTS 4,662,561 A * 5/1987 Dietzsch ............ B60H 1/00328
165/170
4,920,759 A * 5/1990 Tanaka ............... B60H 1/00478
165/203
(Continued)

FOREIGN PATENT DOCUMENTS

FR 2976855 A1 12/2012
GB 939292 A 10/1963
(Continued)

OTHER PUBLICATIONS

International Search Report and Written Opinion (in Japanese with English Translation) for PCT/JP2014/001392, dated Jun. 10, 2014; ISA/JP.

*Primary Examiner* — Travis Ruby
(74) *Attorney, Agent, or Firm* — Harness, Dickey & Pierce, P.L.C.

(57) ABSTRACT

A radiant heater air-conditioning system includes: a heater main body having a heating portion energized to generate heat so as to radiate a radiant heat into a vehicle interior; an energization setting unit that sets an energization enable state for enabling energization of the heating portion and an energization disable state for disabling the energization of the heating portion; and an air-conditioning control apparatus that controls an air-conditioning output of a heating operation in the vehicle interior. The air-conditioning control apparatus reduces the air-conditioning output when the energization enable state is set, compared with when the energization disable state is set.

16 Claims, 9 Drawing Sheets (51) Int. Cl.
*H05B 1/02* (2006.01)
*H05B 3/20* (2006.01)

(52) U.S. Cl.
CPC .............. *H05B 3/20* (2013.01); *B60H 1/2225* (2013.01); *B60H 2001/224* (2013.01); *B60H 2001/2265* (2013.01); *B60H 2001/2287* (2013.01); *H05B 2203/011* (2013.01); *H05B 2203/022* (2013.01); *H05B 2203/032* (2013.01)

(58) Field of Classification Search
CPC ......... B60H 1/00742; B60H 2001/224; B60H 2001/2265; B60H 2001/2287; H05B 1/0236; H05B 3/20; H05B 2203/011; H05B 2203/022; H05B 2203/032
See application file for complete search history.

(56) References Cited

U.S. PATENT DOCUMENTS

| | | | | |
|---|---|---|---|---|
| 5,172,856 | A * | 12/1992 | Tanaka | G05D 23/27 236/49.3 |
| 5,579,994 | A * | 12/1996 | Davis, Jr. | B60H 1/00735 236/49.3 |
| 5,667,710 | A * | 9/1997 | Kraemer | B60H 1/00735 165/41 |
| 5,878,809 | A * | 3/1999 | Heinle | B60H 1/00742 165/203 |
| 6,237,675 | B1 * | 5/2001 | Oehring | B60H 1/00285 165/288 |
| 6,454,178 | B1 * | 9/2002 | Fusco | B60H 1/00742 165/203 |
| 7,389,812 | B2 * | 6/2008 | Kumada | B60H 1/00742 165/202 |
| 9,102,215 | B2 * | 8/2015 | Kumar | B60H 1/00742 |
| 9,150,132 | B2 * | 10/2015 | Hoke | B60H 1/00285 |
| 9,348,792 | B2 * | 5/2016 | Chung | G06F 15/7867 |
| 2003/0039298 | A1 * | 2/2003 | Eriksson | B60H 1/00785 374/109 |
| 2010/0176110 | A1 * | 7/2010 | Ogino | B60H 1/00271 219/202 |
| 2011/0114739 | A1 | 5/2011 | Misumi et al. | |
| 2011/0284202 | A1 * | 11/2011 | Hirai | B60H 1/00742 165/287 |
| 2012/0061365 | A1 | 3/2012 | Okamoto et al. | |
| 2012/0168420 | A1 * | 7/2012 | Ogino | B60H 1/00285 219/217 |
| 2012/0267354 | A1 * | 10/2012 | Okamoto | F24D 13/02 219/202 |
| 2013/0059522 | A1 * | 3/2013 | Ota | B60H 1/00842 454/159 |
| 2013/0068440 | A1 | 3/2013 | Kamiyama | |
| 2013/0232996 | A1 * | 9/2013 | Goenka | B60N 2/56 62/3.61 |
| 2013/0277352 | A1 * | 10/2013 | Degen | H05B 3/84 219/203 |
| 2014/0110489 | A1 * | 4/2014 | Yasui | B60H 1/00285 237/5 |
| 2015/0110477 | A1 | 4/2015 | Ota et al. | |

FOREIGN PATENT DOCUMENTS

| | | |
|---|---|---|
| JP | H06234318 A | 8/1994 |
| JP | 2010111251 A | 5/2010 |
| JP | 2011121572 A | 6/2011 |
| JP | 2011246091 A | 12/2011 |
| JP | 2012035844 A | 2/2012 |
| JP | 2012056531 A | 3/2012 |
| JP | 2014000944 A | 1/2014 |
| JP | 2014003000 A | 1/2014 |
| WO | WO-2008146689 A1 | 12/2008 |
| WO | WO-2014155940 A1 | 10/2014 |
| WO | WO-2014156038 A1 | 10/2014 |

* cited by examiner

RADIANT HEATER AIR-CONDITIONING SYSTEM

CROSS REFERENCE TO RELATED APPLICATIONS

This application is a U.S. National Phase Application under 35 U.S.C. 371 of International Application No. PCT/JP2014/001392 filed on Mar. 12, 2014 and published in Japanese as WO 2014/167774 A1 on Oct. 16, 2014. This application is based on and claims the benefit of priority from Japanese Patent Application No. 2013-084352 filed on Apr. 12, 2013. The entire disclosures of all of the above applications are incorporated herein by reference.

TECHNICAL FIELD

The present disclosure relates to a radiant heater air-conditioning system.

BACKGROUND ART

Patent Literature 1 and Patent Literature 2 disclose radiant heater devices. The radiant heater device is disposed to oppose an occupant in a vehicle interior.

PRIOR ART LITERATURES

Patent Literature

Patent Literature 1: JP 2012-56531 A
Patent Literature 2: JP 2010-111251 A

SUMMARY OF INVENTION

A further improvement in the radiant heater device is demanded to provide appropriate heating feeling for an occupant.

An object of the present disclosure is to provide a radiant heater air-conditioning system that provides an appropriate heating feeling for an occupant.

According to an aspect of the present disclosure, a radiant heater air-conditioning system includes: a heater main body having a heating portion energized to generate heat so as to radiate a radiant heat into a vehicle interior; an energization setting unit that sets an energization enable state for enabling energization of the heating portion and an energization disable state for disabling the energization of the heating portion; and an air-conditioning control apparatus that controls an air-conditioning output of a heating operation in the vehicle interior. The air-conditioning control apparatus reduces the air-conditioning output when the energization enable state is set, compared with when the energization disable state is set.

According to an aspect of the present disclosure, a radiant heater air-conditioning system includes: a heater main body having a heating portion energized to generate heat so as to radiate a radiant heat into a vehicle interior; an energization setting unit that sets an energization enable state for enabling energization of the heating portion and an energization disable state for disabling the energization of the heating portion; and an air-conditioning control apparatus that controls an air-conditioning output of a heating operation in the vehicle interior. The air-conditioning control apparatus reduces the air-conditioning output to a seat toward which the radiant heat is radiated from the heater main body and does not reduce the air-conditioning output to a seat toward which the radiant heat is not radiated from the heater main body when the energization enable state is set.

When the energization enable state is set, the heating portion may by energized to radiate the radiant heat from the heater main body. Therefore, heating by the radiant heat is provided to the occupant. In the energization enable state, because an air-conditioning output of the heating operation is reduced as compared with an energization disable state, a heating capacity by the vehicle interior air-conditioning is set to be smaller. As a result, since the suppressed heating capacity of the vehicle interior air-conditioning and the heating by the radiant heat are provided to the vehicle interior, the output of an excess heating capacity can be prevented, and the occupant can be prevented from feeling excess heating. Therefore, a radiant heater air-conditioning system that prevents the supply of excess heating to the occupant can be provided to give proper heating feeling to the occupant.

DESCRIPTION OF EMBODIMENTS

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
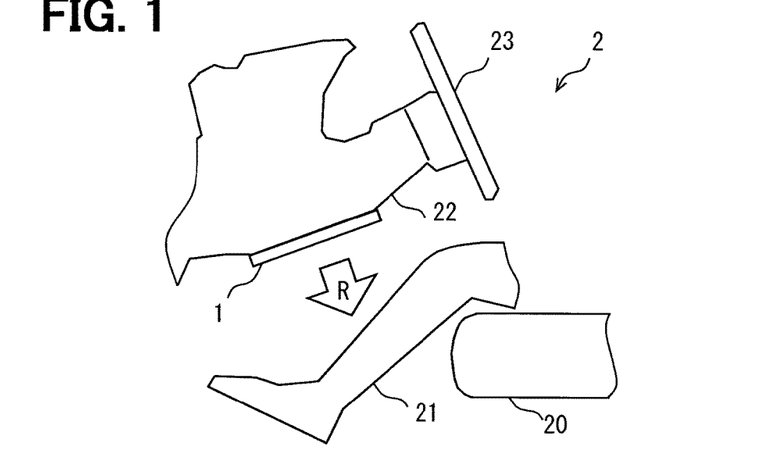
FIG. 1 is a diagram illustrating a positional relationship between a radiant heater device according to a first embodiment and an occupant.

The present disclosure is applicable to a radiant heater device 1 which is installed in an interior of a moving body such as vehicle to drive on a road, ship, or aircraft, or an interior of a building fixed to the land. Referring to FIG. 1, the device 1 according to a first embodiment configures a part of a heating system 2 for a vehicle interior. The device 1 is an electric heater to generate heat, and is powered by a power supply such as a battery or a power generator mounted in the moving body. The device 1 is formed into a thin plate. The device 1 is powered to generate the heat. The device 1 radiates a radiant heat R mainly in a direction perpendicular to a surface of the device 1 for the purpose of heating an object located in the direction perpendicular to the surface.

A seat 20 on which an occupant 21 is to be seated is installed in the vehicle interior. The device 1 is installed in the interior to radiate the radiant heat R toward feet of the occupant 21. The device 1 is installed on a wall surface of the interior. The wall surface of the interior is an interior part such as an instrument panel, a door trim, or a ceiling. The device 1 is installed to face the occupant 21 with an expected normal posture. For example, the vehicle to drive on a road has a steering column 22 for supporting a steering wheel 23. The device 1 can be installed on a lower surface of the steering column 22 so as to face the occupant 21.

Figure 2:
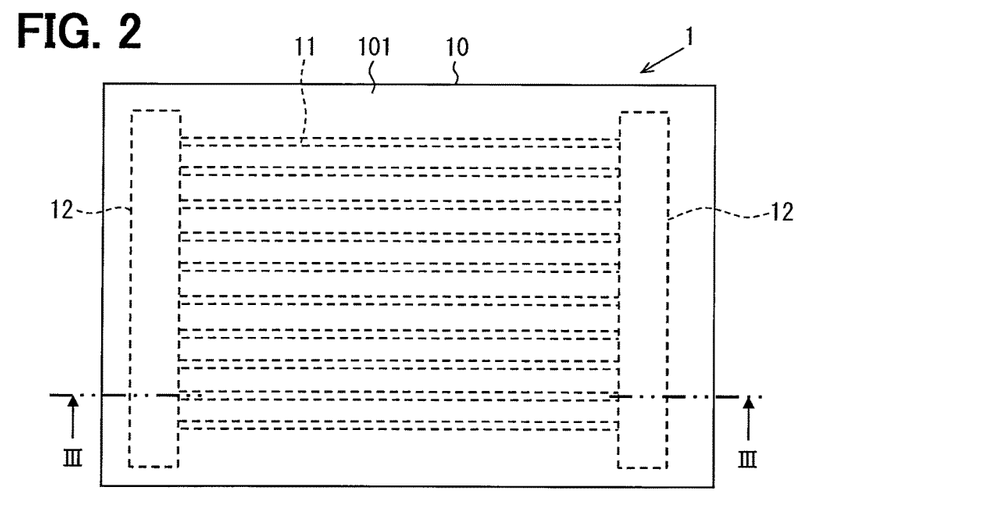
FIG. 2 is a top view of the radiant heater device according to the first embodiment.

As illustrated in FIG. 2, the device 1 is formed in a substantially rectangular thin plate. The device 1 includes a substrate portion 10 configuring a heater main body, multiple heating portions 11, and a pair of terminals 12 which is a conductive part. The device 1 can be also called "surface heater" that radiates the radiant heat R mainly in the direction perpendicular to the surface.

Figure 3:
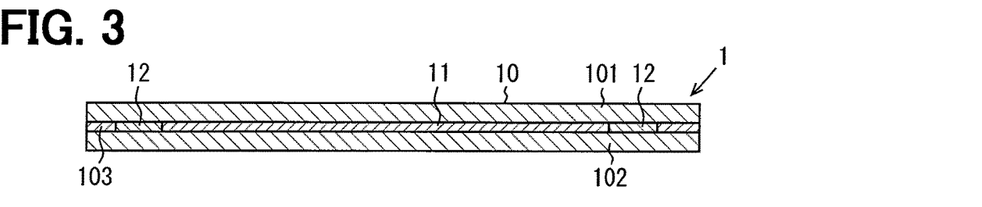
FIG. 3 is a cross-sectional view of the radiant heater device according to the first embodiment.

The substrate portion 10 is made of a resin material that provides excellent electric insulation properties, and withstands a high temperature. The substrate portion 10 is a multilayer substrate. The substrate portion 10 includes a front surface layer 101, a rear surface layer 102, and an intermediate layer 103. The radiant heat R is radiated from the front surface layer 101 in a radiant direction. In other words, the front surface layer 101 is arranged to face a part of the occupant 21 which is an object to be heated in an installed state of the device 1. The rear surface layer 102 forms a back surface of the device 1. The intermediate layer 103 supports the heating portions 11 and the terminals 12. The substrate portion 10 is a member for supporting the multiple heating portions 11 each of which is linear. The front surface layer 101, the rear surface layer 102, and the intermediate layer 103 are an insulating part made of a material lower in thermal conductivity than the heating portions 11 and the terminals 12. For example, the front surface layer 101, the rear surface layer 102, and the intermediate layer 103 are made of polyimide resin.

Each of the multiple heating portions 11 is made of a material that is energized to generate heat. The heating portions 11 can be made of metal material. For example, the heating portions 11 can be made of copper, silver, tin, stainless steel, nickel, or nichrome. Each of the multiple heating portions 11 is formed into a linear shape or a plate shape which is in parallel to the surface of the substrate portion 10, and dispersed over the surface of the substrate portion 10.

Each of the heating portions 11 is connected to the pair of terminals 12 arranged at a predetermined interval. The heating portions 11 are spaced from each other between the pair of terminals 12. The multiple heating portions 11 are connected in parallel to the pair of terminals 12 so as to bridge between the pair of terminals 12, and disposed over the substantially overall surface of the substrate portion 10. The multiple heating portions 11 are disposed to be interposed between the front surface layer 101 and the rear surface layer 102 together with the intermediate layer 103. The multiple heating portions 11 are protected from an external by the substrate portion 10.

The respective heating portions 11 are members that are thermally connected to at least the front surface layer 101 and energized to generate heat. With the above configuration, the heat generated by the heating portions 11 is transmitted to the front surface layer 101. The heat generated by one of the heating portions 11 is radiated from the front surface layer 101 toward the external as a radiant heat through a member such as the substrate portion 10, and supplied to the occupant 21.

The heating portions 11 are each set to have a predetermined length for the purpose of obtaining a predetermined amount of heat generation. Therefore, each of the heating portions 11 is set to have a predetermined resistance. Each of the heating portions 11 has a dimension and a shape set so that a thermal resistance in a lateral direction has a predetermined value. With the above configuration, the multiple heating portions 11 generate the predetermined amount of heat when a predetermined voltage is applied. The multiple heating portions 11 generate the predetermined amount of heat, and rise to a predetermined temperature. The multiple heating portions 11 with the predetermined temperature heat the front surface layer 101 to have a predetermined radiation temperature. The device 1 can radiate a radiant heat R that allows the occupant 21, that is, a person to feel warm.

Figure 4:
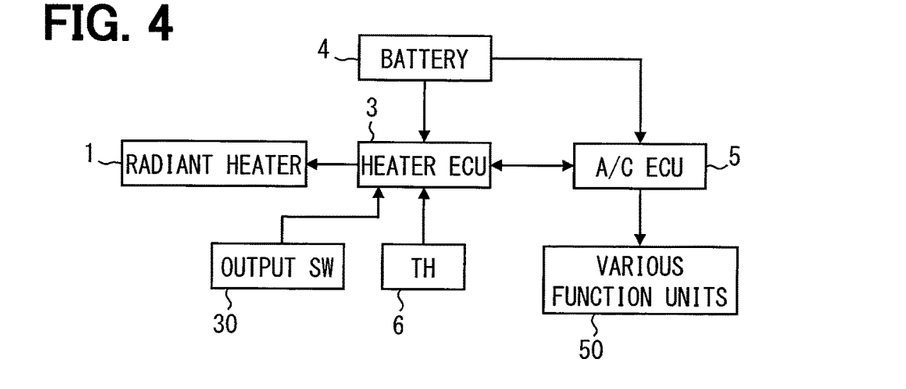
FIG. 4 is a block diagram illustrating a radiant heater air-conditioning system according to the first embodiment.

Hereinafter, a configuration for a control of a radiant heater air-conditioning system will be described with reference to FIG. 4. The output, the temperature, and the amount of heat generation of the heating portion 11 are controlled by a heater ECU 3. The heater ECU 3 is a control device that controls the operation of the device 1. The heater ECU 3 can control the output, the temperature, and the amount of heat generation of the heating portion 11 by controlling a voltage value and a current value to be given to the heating portion 11. Therefore, the heater ECU 3 can change the amount of radiant heat to be given to the occupant 21. When the energization of the device 1 is started by the heater ECU 3, a surface temperature of the device 1 rapidly rises up to the predetermined radiation temperature to be controlled. This makes it possible to rapidly give warmth to the occupant 21 even in winter.

When an object comes in contact with the front surface layer 101 of the device 1, the heat transmitted from the heating portion 11 to the front surface layer 101 is rapidly transmitted to the contact object. This results in a rapid reduction in the temperature of the contact portion of the front surface layer 101. Hence, the surface temperature of the device 1 on the portion with which the object comes in contact is rapidly reduced. The heat of the portion with which the object comes in contact is transmitted to the contact object, and diffused into the contact object. For that reason, an excess rise of the surface temperature of the contact object is suppressed.

A signal from an output switch 30 is input to the heater ECU 3. The output switch 30 can transmit, to the heater ECU 3, a signal indicative of a command for energizing the heating portion 11 from a state in which the heating portion 11 is not energized, and a signal indicative of a command for stopping the energization of the heating portion 11 from a state in which the heating portion 11 is energized. The output switch 30 is an energization setting unit that can set an energization enable state for enabling the energization of the heating portion 11, and an energization disable state for disabling the energization of the heating portion 11, by transmission of the above signals.

Figure 5:
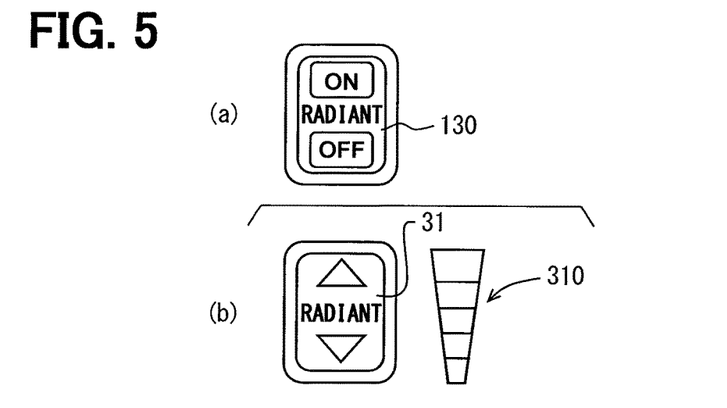
FIG. 5 is a diagram illustrating respective parts for output operation in the radiant heater device according to the first embodiment.

The output switch 30 may be configured by an on/off switch 130 illustrated in FIG. 5 (*a*). The heater ECU 3 is configured to receive switch signals from the output switch 30 and a level setting switch 31 on an operation panel which is installed integrally with the instrument panel. The on/off switch 130 is the energization setting unit whose on-button is operated for the heater ECU 3 by the occupant to transmit an operation signal for setting the energization enable state, and whose off-button is operated to transmit a stop signal for setting the energization disable state.

Similarly, when an ignition switch turns on from off in a state where the output switch 30 is set to on, the heating portion 11 is set in the energization enable state by the energization setting unit. When the ignition switch turns on from off in a state where the output switch 30 is set to off, the heating portion 11 is set in the energization disable state by the energization setting unit.

The heater ECU 3 may be configured to set an output level of the heating portion 11. The output level can be set to predetermined multiple steps. The output level of the heating portion 11 may be determined by arithmetic operation using a predetermined program in an automatic operation, or may be determined according to a command signal transmitted by allowing an output level operation unit to be operated by the occupant.

The level setting switch 31 is the output level operation unit having a level up switch and a level down switch operated by the occupant to set the output level of the heating portion 11 and to instruct the heater ECU 3 on the set output level. In the level setting switch 31, for example, the output level can be set to multiple steps so as to be indicated by a lighting length of an indicator 310 shown in FIG. 5 (*b*). The output level may be set to three steps of "high", "middle" and "low" by the operation of the level setting switch 31. The level setting switch 31 may be of a dial level adjustment equipment that makes a level value variable by rotating a knob part.

The heater ECU 3 is configured to perform arithmetic processing and control processing with the supply of a DC power from the battery 4 which is a vehicle power supply mounted in the vehicle, regardless of on/off states of an ignition switch that controls start and stop of an engine. The heater ECU 3 can supply an electric power obtained from the battery 4 to the device 1, and control the supply power. The heater ECU 3 can control the output of the heating portion 11 under the power control.

The battery 4 may be configured by, for example, an assembled battery having a stack of multiple unit cells. Each of the unit cells can be formed of, for example, a nickel-hydrogen secondary battery, a lithium ion secondary battery, or an organic radical battery. The battery 4 is chargeable and dischargeable, and can be used to supply an electric power to a vehicle travel motor.

The heater ECU 3 is provided with a microcomputer including functions of a CPU (central processing unit) that performs arithmetic processing and control processing, a memory such as a ROM or a RAM, and an I/O port (input/output circuit). The temperature sensor 6 includes a temperature detection unit that detects temperature information as an electric signal in contact with the substrate portion 10, and a signal line that is connected to the heater ECU 3, and transmits the electric signal detected by the temperature detection unit to the heater ECU 3. The signals from the temperature sensor 6 are subjected to A/D conversion by the I/O port or an A/C converter circuit, and thereafter input to the microcomputer. The heater ECU 3 controls the operation and output of the device 1 with the use of a temperature of the heater main body detected by the temperature sensor 6.

The memory such as the ROM or the RAM configures the storage unit of the heater ECU 3. The storage unit stores a predetermined calculation program, and predetermined control characteristic data which is a source of a control characteristic graph in advance. The control characteristic data is used for an output control of the heating portion 11 by the heater ECU 3. The heater ECU 3 can realize the operation of the radiant heater device 1 in conjunction with the air-conditioning operation made by the air-conditioning ECU 5.

The heater ECU 3 may be configured to be communicatable with the air-conditioning ECU 5. The air-conditioning ECU 5 is an air-conditioning control apparatus that includes a microcomputer such as a CPU, a ROM, or a RAM, and peripheral circuits of the microcomputer, and controls the air-conditioning of the vehicle interior with the supply of a DC power supply from the battery 4. The air-conditioning ECU 5 receives the respective detection signals from air-conditioning control sensors such as an inside air sensor, an outside air sensor, a solar radiation sensor, a discharge temperature sensor, a discharge pressure sensor, an evaporator temperature sensor, and an outdoor heat exchanger temperature sensor.

The air-conditioning ECU 5 performs various calculations and processing with the use of the above detection signals and the stored air-conditioning control program, and outputs control signals to actuators for respective mode doors, a motor driver circuit of a blower motor, a capacity control valve of a compressor, and a clutch driver circuit of an electromagnetic clutch. The memory such as the ROM or the RAM configures the storage unit of the heater ECU 3. The storage unit stores a predetermined air-conditioning control program, and predetermined control characteristic data which is a source of various control characteristic graphs in advance. The control characteristic data is used for an air-conditioning control of the vehicle interior by the air-conditioning ECU 5. With the above configuration, the air-conditioning ECU 5 controls various air-conditioning function components 50 that contribute to the vehicle interior air-conditioning.

The air-conditioning ECU 5 implements the air-conditioning operation in conjunction with the operation of the device 1 by the heater ECU 3. The air-conditioning function components 50 includes a compressor of an air-conditioning refrigeration cycle, an indoor blower, an inside and outside air switching unit (inside and outside air switching door), an air mix door, and a blowing mode switching door.

Figure 6:
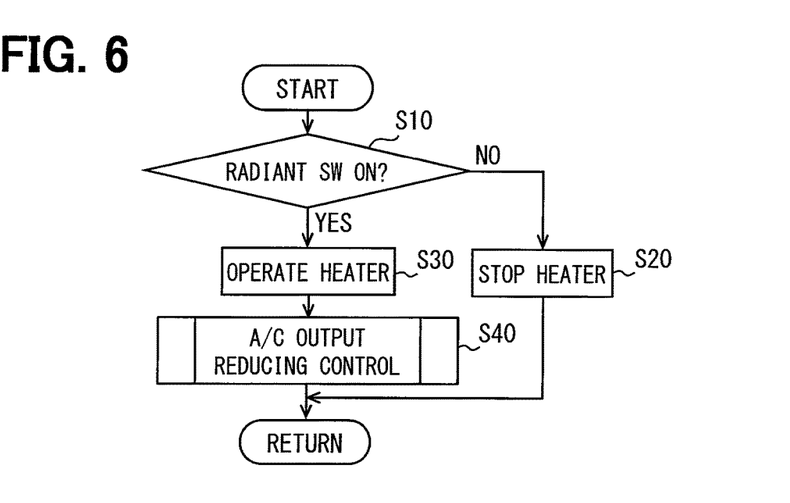
FIG. 6 is a flowchart illustrating a linkage control of a vehicle interior air-conditioning and the radiant heater device according to the first embodiment.

Then, a linkage control of the device 1 with the vehicle interior air-conditioning apparatus will be described. FIG. 6 illustrates a flowchart of the linkage control. The heater ECU 3 determines whether the energization enable state is set by the output switch 30, or not, in S10. In S10, if the energization enable state is set by the energization setting unit, the determination is YES, and if the energization disable state is set, the determination is NO.

If the determination is NO in S10, the heater ECU 3 executes a process of stopping the heater in S20. Therefore, in the case of that determination result, the device 1 does not operate, and the heater ECU 3 again returns to S10, and repetitively executes the subsequent respective processes.

If the determination is YES in S10, the heater ECU 3 starts the energization of the heating portion 11, and executes a process of operating the heater in S20. Then, because the device 1 operates, that is, the radiant heat is radiated in the vehicle interior, the heater ECU 3 executes an air-conditioning capacity reduction control by a vehicle air-conditioning apparatus (hereinafter also called "air-conditioning apparatus") in S40. After execution of that control, the heater ECU 3 again returns to S10, and repetitively executes the subsequent respective processes.

The air-conditioning capacity reduction control reduces the air-conditioning output of heating operation by the air-conditioning apparatus when the energization enable state is set, compared with when the energization disable state is set. In other words, in the air-conditioning capacity reduction control, when the device 1 is in an on-state, the output of the vehicle interior air-conditioning is changed toward a reduction.

Figure 7:
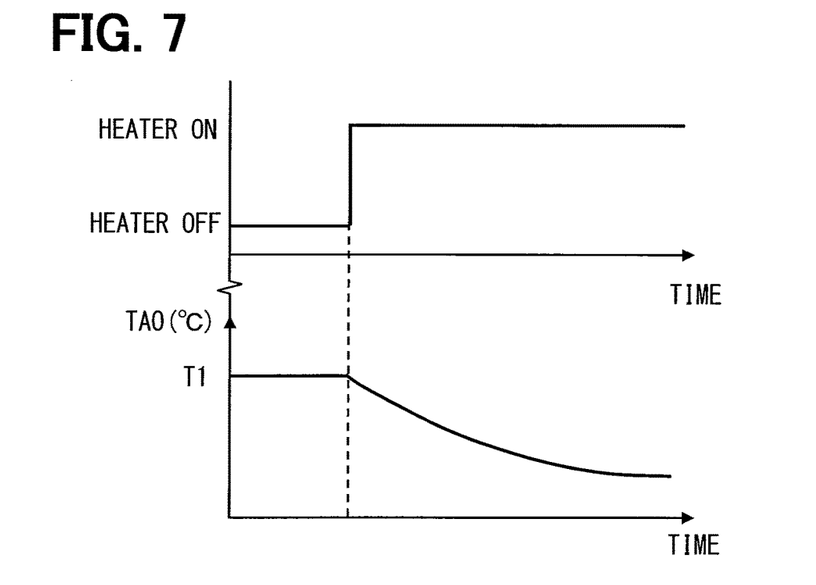
FIG. 7 is a time chart illustrating an air-conditioning capacity reduction control in FIG. 6.

A first example of the air-conditioning capacity reduction control is an output control illustrated in FIG. 7. In the first example, as illustrated in FIG. 7, when the heater changes from the off-state to an on-state, that is, from the energization disable state to the energization enable state, the air-conditioning apparatus reduces an air-conditioning capacity so as to gradually decrease a target outlet air temperature TAO from T1 (° C.) in the energization disable state. Therefore, the air-conditioning apparatus reduces the air-conditioning output of the heating operation by the air-conditioning apparatus when the energization enable state is set, compared with when the energization disable state is set.

Figure 8:
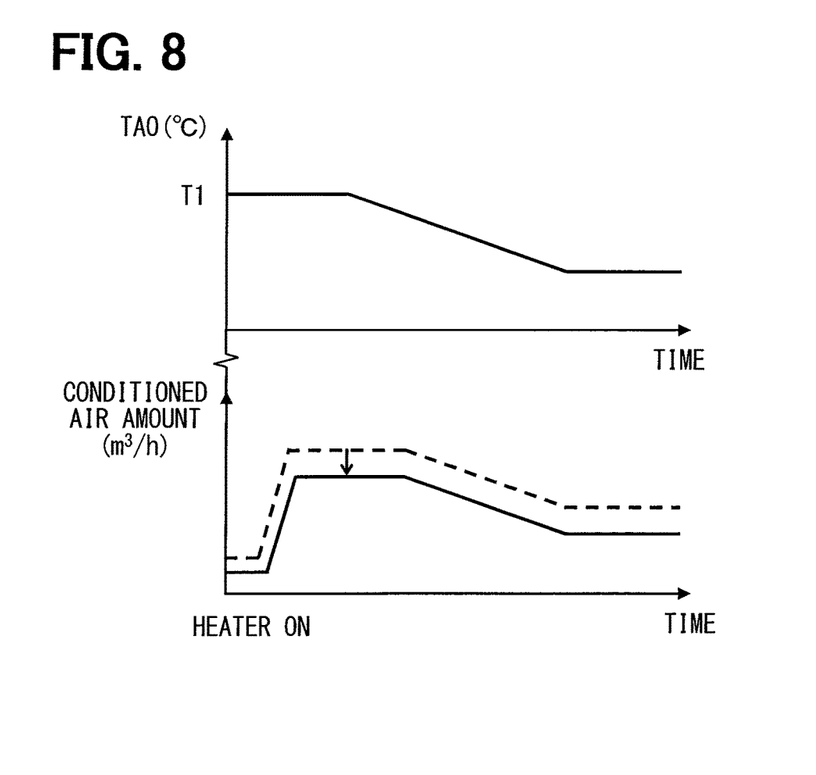
FIG. 8 is a time chart illustrating a control for changing an amount of conditioned air according to a target outlet air temperature under the air-conditioning capacity reduction control of FIG. 6.

Further, in the air-conditioning capacity reduction control, as illustrated in a time chart of FIG. 8, the air-conditioning apparatus may change the amount of conditioned air according to the target outlet air temperature TAO. Specifically, as illustrated in FIG. 8, when the heater becomes in the on-state, that is, in the energization enable state, the air-conditioning capacity reduction control changes the air-conditioning wind volume blown into the vehicle interior on the basis of a predetermined calculation program or control characteristic data. Referring to FIG. 8, a change in the air-conditioning air volume indicated by a dashed line represents a value in the energization disable state, and a change in the air-conditioning wind volume indicated by a solid line represents a value in the energization enable state. In that case, the heater ECU 3 may communicate with the air-conditioning ECU 5, and control the heat output of the device 1 to change according to the target outlet air temperature TAO.

Figure 9:
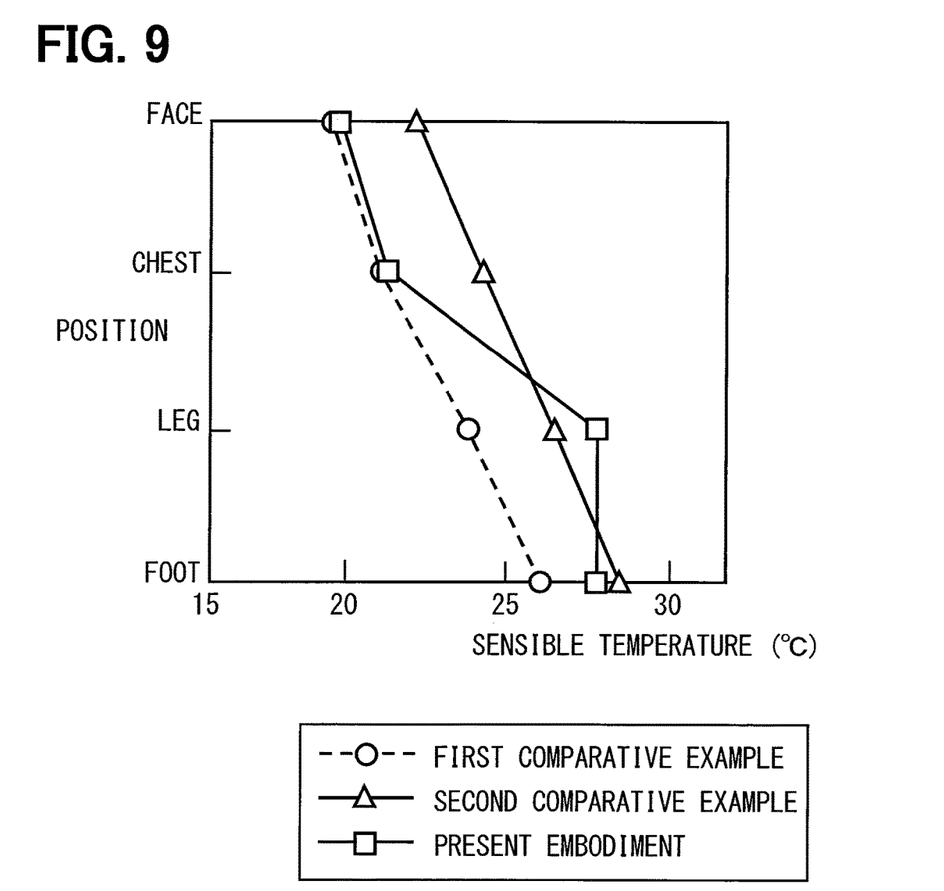
FIG. 9 is a graph comparing the first embodiment with a comparative examples as to sensible temperatures at respective portions of an occupant body.

FIG. 9 is a graph comparing study results between a conventional air-conditioning control and the air-conditioning capacity reduction control, as to sensible temperatures at respective portions of an occupant body. In the conventional air-conditioning control, the device 1 is not operated, and only the air-conditioning operation is performed. The study results are made in the heating operation where an outside air temperature in winter is −5° C.

Round plots represent the sensible temperatures at the respective portions of an occupant 21 when the air-conditioning wind volume is set to a low air volume under the conventional air-conditioning control, as a first comparative example. Triangle plots represent the sensible temperatures at the respective portions of the occupant 21 when the air-conditioning wind volume is automatically set under the conventional air-conditioning control, as a second comparative example. Square plots represent the sensible temperatures at the respective portions of the occupant 21 when the air-conditioning wind volume is set to the low air volume under the air-conditioning capacity reduction control according to the first embodiment.

In the air-conditioning capacity reduction control, because the conditioned air volume is set to the low air volume, the sensible temperatures of an upper body such as a face and a chest are the same level as those in the case of the round plots, but the sensible temperatures at lower legs and feet show large heating feeling although the conditioned air volume is set to the same low air volume. The heating feeling is comparable to that in the case of the triangle plots. Therefore, in the air-conditioning capacity reduction control according to the first embodiment, the heating feeling of the lower body is sufficiently obtained while the power consumption of the system is suppressed with the suppression of the heating feeling of the upper body of the occupant 21. In this way, according to the air-conditioning capacity reduction control, a heating operation can keep the occupant's head cold and keep the occupants' feet warm, while the occupant 21 hardly feel the wind.

Figure 10:
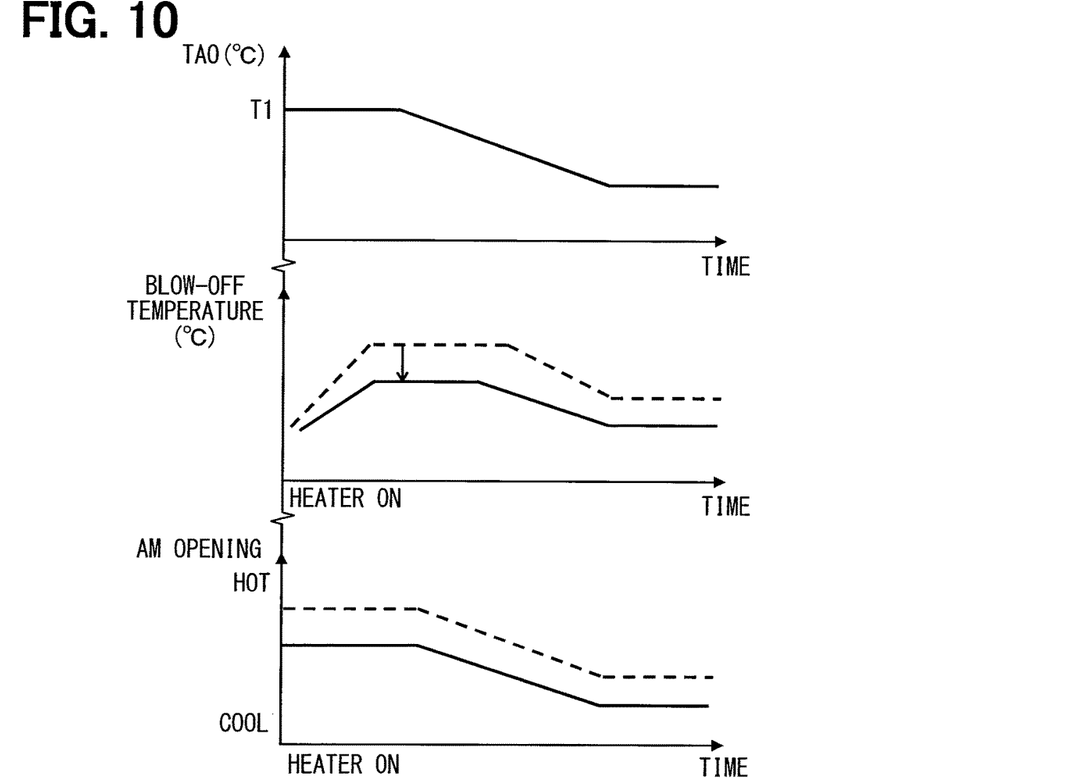
FIG. 10 is a time chart illustrating a control for changing an outlet temperature of conditioned air actually blown and an air mix opening according to the target outlet air temperature under the air-conditioning capacity reduction control of FIG. 6.

In the air-conditioning capacity reduction control, as illustrated in a time chart of FIG. 10, an actual blow-off air temperature and opening of the air mix door may be changed according to the target outlet air temperature TAO. Specifically, as illustrated in FIG. 10, when the heater becomes in the on-state, that is, in the energization enable state, the air-conditioning capacity reduction control changes an actual blow-off temperature of the air blown into the vehicle interior, or changes the opening of the air mix door on the basis of a predetermined calculation program or control characteristic data.

Referring to FIG. 10, a change in the blow-off air temperature and the opening of the air mix door indicated by a dashed line represents a value in the energization disable state, and a change in the blow-off air temperature and the opening of the air mix door indicated by a solid line represents a value in the energization enable state. Therefore, under the air-conditioning capacity reduction control, when the energization enable state is set, the actual blow-off air temperature of the air-conditioning apparatus may be set to be lower than that when the energization disable state is set, and the opening of the air mix door may be displaced toward a cool side so that the outlet air temperature becomes low to increase a rate of air volume of cold air compared with when the energization disable state is set. In that case, the heater ECU 3 may communicate with the air-conditioning ECU 5, and control the heat output of the device 1 to change according to the target outlet air temperature TAO.

Figure 11:
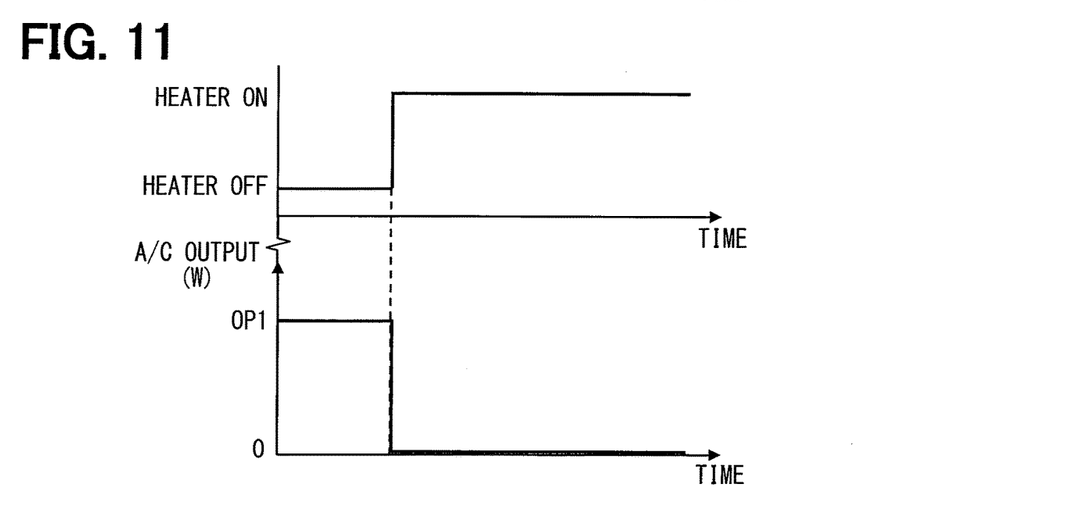
FIG. 11 is a time chart illustrating an air-conditioning capacity reduction control in FIG. 6.

A second example of the air-conditioning capacity reduction control is an output control illustrated in FIG. 11. In the second example, as illustrated in FIG. 11, when the heater changes from the off-state to the on-state, that is, from the energization disable state to the energization enable state, the air-conditioning apparatus reduces the air-conditioning output of the heating operation to zero from OP1 (W). Therefore, when the energization enable state is set, the air-conditioning apparatus stops the heating operation implemented when the energization disable state is set, to thereby decrease the air-conditioning output of the heating operation by the air-conditioning apparatus compared with when the energization disable state is set.

Figure 12:
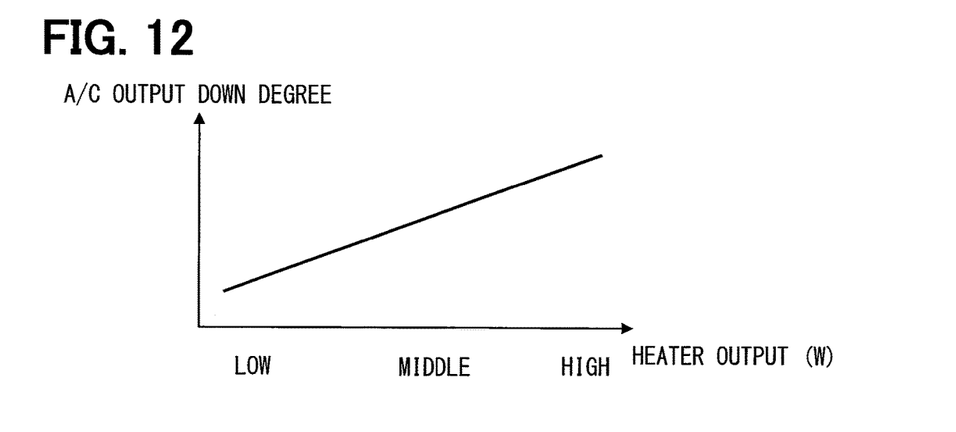
FIG. 12 is a control characteristic graph illustrating a relationship between an output of a heater and a reduced amount of an air-conditioning output in the air-conditioning capacity reduction control in FIG. 6.

Further, in the air-conditioning capacity reduction control, the air-conditioning output of the heating operation may be reduced according to a control characteristic graph satisfying a relationship between the output of the heater and the reduced amount of air-conditioning output illustrated in FIG. 12. The control characteristic graph is stored in a storage unit provided in the heater ECU 3 or the air-conditioning ECU 5.

The output levels of the device 1 can be set to at least three steps of "high", "middle", and "low" as illustrated in FIG. 12. For example, when the output level is set by the level setting switch 31, the air-conditioning ECU 5 sets the reduced amount of air-conditioning output to be larger as the heater output becomes higher toward the "high" level, and to be smaller as the heater output becomes lower toward the "low" level.

Figure 13:
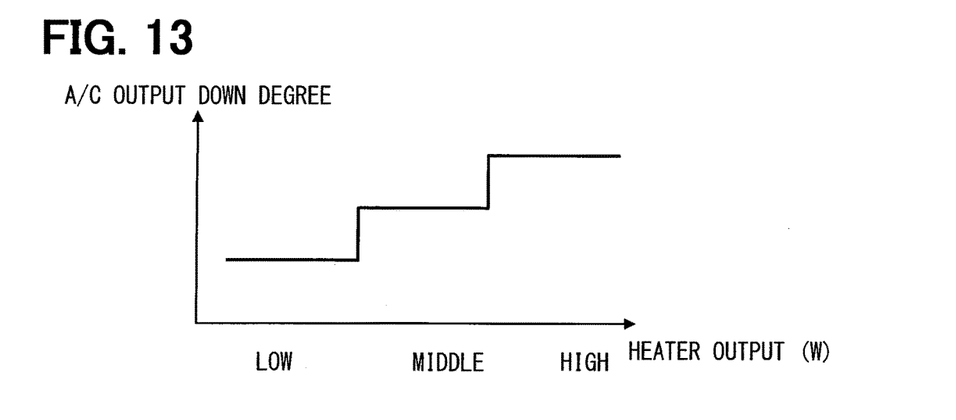
FIG. 13 is a graph illustrating a modification of the control characteristic graph of FIG. 12.

The reduced amount of air-conditioning output may be controlled according to the control characteristic graph illustrated in FIG. 13. The control characteristic graph illustrated in FIG. 13 is a modification of FIG. 12. Predetermined control characteristic data illustrated in FIG. 13 is stored in a storage unit provided in the heater ECU 3 or the air-conditioning ECU 5.

The reduced amount of air-conditioning output illustrated in FIG. 13 has such a characteristic to increase in a stepwise fashion as the output of the heater increases more. Therefore, the air-conditioning ECU 5 controls the reduced mount of air-conditioning output to increase in a stepwise fashion as the output of the heater becomes higher, and controls the reduced mount of air-conditioning output to decrease in a stepwise fashion as the output of the heater becomes lower.

Then, the effects of the radiant heater air-conditioning system according to the first embodiment will be described. The radiant heater air-conditioning system includes the substrate portion 10 that radiates the radiant heat into the vehicle interior, the output switch 30 that sets an energization enable state for enabling the energization of the heating portion 11 and an energization disable state for disabling the energization of the heating portion 11, and the air-conditioning ECU 5 that controls the air-conditioning output. When the energization enable state is set, the air-conditioning ECU 5 reduces the air-conditioning output of the heating operation compared with when the energization disable state is set.

According to the above control, in the energization enable state, because an air-conditioning output of the heating operation is reduced as compared with the energization disable state, a heating capacity by the vehicle interior air-conditioning apparatus is set to be smaller. With the above configuration, the heating capacity suppressed in the vehicle interior air-conditioning apparatus and the heating operation by the radiant heat are provided to the vehicle interior. For that reason, the extra heating capacity by the vehicle interior air-conditioning apparatus can be prevented, and the supply of excessive heating feeling to the occupant 21 can be avoided. Therefore, proper heating feeling can be provided to the occupant 21 without production of skin dry caused by the excessive heating. Further, with a reduction in the air-conditioning output, the amount of heat supplied by the air-conditioning wind blown into the interior is reduced, and power saving can be achieved in the heating operation as the overall system. According to the above system, the radiant heater air-conditioning system in which the total output from the heating portion 11 and the air-conditioning apparatus does not become an unnecessary capacity can be realized.

When the radiant heat is radiated from the radiant heater device 1, because the occupant 21 is liable to feel warm due to the radiant heat, the occupant 21 obtains the heating feeling even if the air-conditioning output from the air-conditioning apparatus is decreased. Further, according to the radiant heater air-conditioning apparatus, when the radiant heat is radiated from the radiant heater device 1, because a skin temperature of the occupant 21 also rises due to the radiant heat, the occupant 21 is unlikely to feel cold even by decreasing the air-conditioning output.

When the energization enable state is set, the air-conditioning ECU 5 reduces the volume of conditioned air wind blown into the vehicle interior compared with when the energization disable state is set. According to the above configuration, with a reduction in the air-conditioning wind volume, the power consumption of the blowing device that provides the conditioned air is reduced, and the power saving can be achieved in the heating operation as the overall system. According to the radiant heater air-conditioning system, the total output from the heating portion 11 and the air-conditioning apparatus does not become an unnecessary capacity.

When the energization enable state is set, the air-conditioning ECU 5 lowers the outlet temperature of conditioned air wind blown into the vehicle interior compared with when the energization disable state is set. According to the above configuration, with a reduction in the outlet temperature of the conditioned air wind, the power consumption of an electric heater that heats air, and the power consumption of an electric compressor that discharges refrigerant toward a heating heat exchanger that heats the air are reduced, and the power saving can be achieved in the heating operation as the overall system. With a reduction in the outlet temperature of the conditioned air wind and a reduction in a temperature of an engine coolant to be supplied to a heater core that heats the air, the energy saving can be achieved in the heating operation as the overall system. According to the radiant heater air-conditioning system, the total output from the heating portion 11 and the air-conditioning apparatus does not become an unnecessary capacity.

When the energization enable state is set, the air-conditioning ECU 5 stops the air-conditioning operation. According to the above configuration, when the radiant heat is radiated from the radiant heater device 1, because the occupant 21 is liable to feel warm due to the radiant heat, the occupant 21 obtains the heating feeling even if the heating operation by the air-conditioning apparatus stops. Further, according to the radiant heater air-conditioning apparatus, when the radiant heat is radiated from the radiant heater device 1, because a skin temperature of the occupant 21 also rises due to the radiant heat, the occupant 21 is unlikely to feel cold even by stopping the air-conditioning operation. Even when the heater output is large, the occupant 21 is unlikely to feel too hot due to the stop of the air-conditioning operation.

The heater ECU 3 is instructed on the output level of the heating portion 11 by the operation of the output level operation unit such as the level setting switch 31. According to the above configuration, the occupant 21 can set the output level of the heating portion 11 according to the sensible temperature. As a result, the radiant heater device 1 complying with the preference of the individual occupants 21 is obtained.

When the energization enable state is set, the air-conditioning ECU 5 changes the reduced amount of air-conditioning output in the heating operation according to the output of the heating portion 11. The control characteristic data used for the control is stored in the storage unit in advance. According to the above configuration, the control characteristic data depending on multiple output levels or an arbitrary output level is stored in advance. Therefore, the setting and control in the reduction amount of the air-conditioning output can be implemented through no complicated calculation.

Second Embodiment

Figure 14:
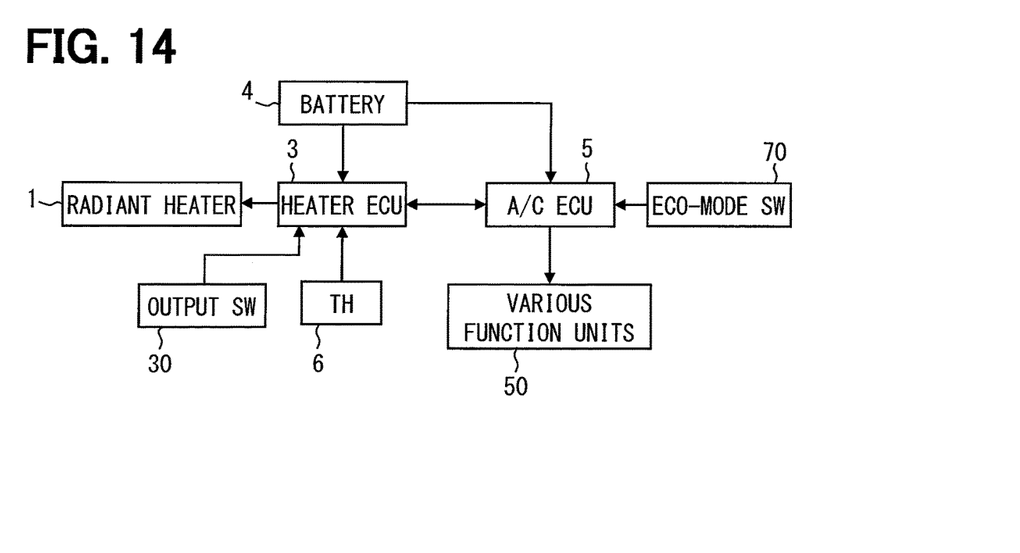
FIG. 14 is a block diagram illustrating a radiant heater air-conditioning system according to a second embodiment.
Figure 15:
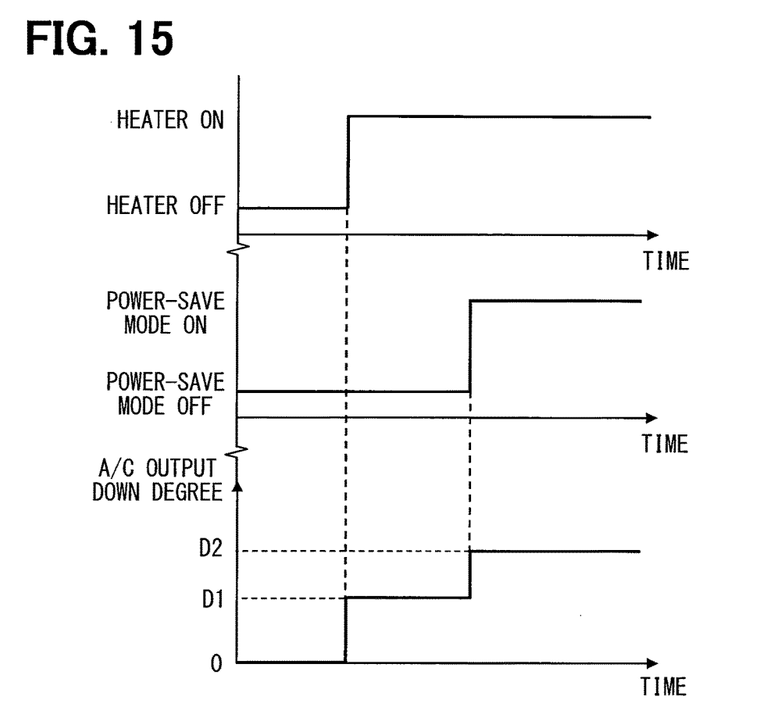
FIG. 15 is a time chart illustrating an air-conditioning capacity reduction control according to the second embodiment.

A radiant heater air-conditioning system according to a second embodiment will be described with reference to FIGS. 14 and 15. In the second embodiment, components denoted by the same symbols as those in the drawings according to the first embodiment and configurations not described are identical with those in the first embodiment, and the same advantages are obtained.

The radiant heater air-conditioning system according to the second embodiment is different from the system of the first embodiment in that an eco-mode switch 70 that can set a power saving mode for suppressing a power consumption is further provided. The eco-mode switch 70 is operated by the occupant 21 to input a signal for setting the power saving mode to the air-conditioning ECU 5.

When a setting signal of the power saving mode is input, and when the energization enable state is set, the air-conditioning ECU 5 controls the reduced mount of air-conditioning output in the heating operation to increase compared with when the power saving mode is not set. In other words, as illustrated in FIG. 15, the air-conditioning ECU 5 sets the reduced amount of air-conditioning output to become D1 when the energization enable state is set (heater is in the on-state), and when the power saving mode is not set. The air-conditioning ECU 5 sets the reduced amount of air-conditioning output to become D2 that is larger than D1 when the energization enable state is set (heater is in the on-state), and when the power saving mode is set.

According to the above control, when the energization enable state and the power saving mode are set, because the air-conditioning output by the heating operation is reduced compared with when the power saving mode is not set, the radiant heater air-conditioning system can further realize the power saving in the context of an occupant's intention.

Third Embodiment

Figure 16:
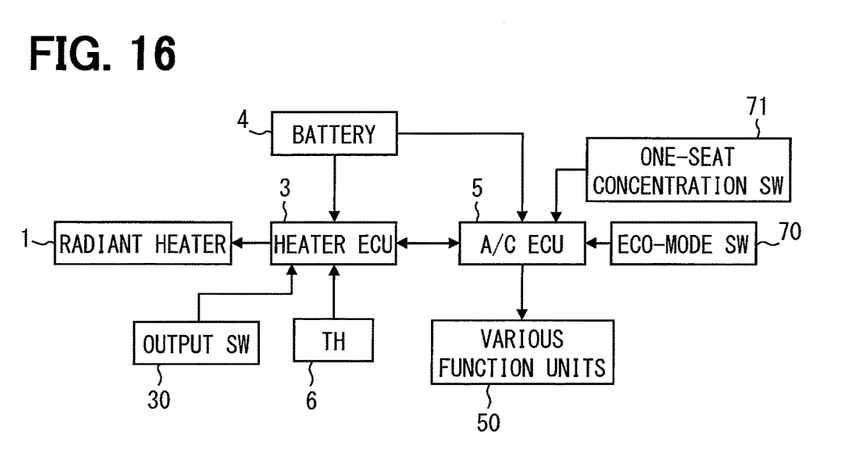
FIG. 16 is a block diagram illustrating a radiant heater air-conditioning system according to a third embodiment.
Figure 17:
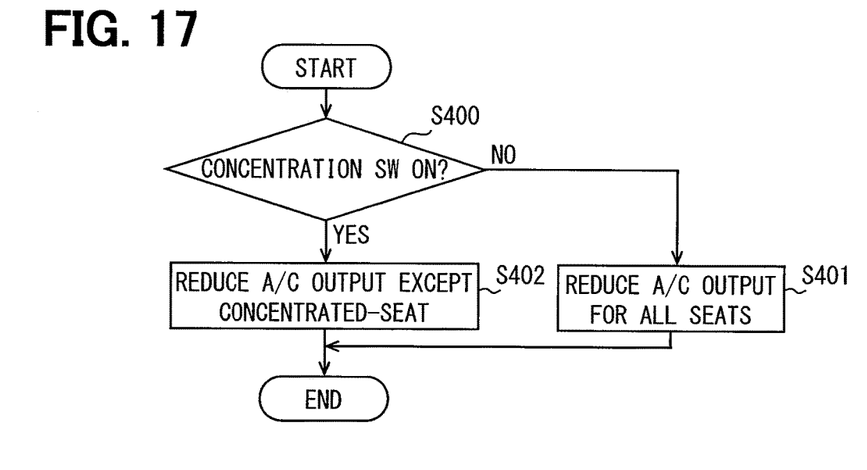
FIG. 17 is a flowchart illustrating a process and control for reducing an air-conditioning capacity according to the third embodiment.

A radiant heater air-conditioning system according to a third embodiment will be described with reference to FIGS. 16 and 17. In the third embodiment, components denoted by the same symbols as those in the drawings according to the first and second embodiments and configurations not described are identical with those in the first and second embodiments, and the same advantages are obtained.

The radiant heater air-conditioning system according to the third embodiment is different from the system of the second embodiment in that a one-seat concentration switch 71 that can set a specific seat mode for prioritizing the air-conditioning of a predetermined seat is further provided. The one-seat concentration switch 71 is a specific-seat switch that can set the specific seat mode, and can set at least one of a front driver seat, a front passenger seat, and rear seats as a specific seat. The one-seat concentration switch 71 is operated by the occupant to input a signal for setting the specific seat mode to the air-conditioning ECU 5.

Subsequently, the air-conditioning capacity reduction control (S40) in FIG. 6 will be described. FIG. 17 illustrates a flowchart of the air-conditioning capacity reduction control. As illustrated in FIG. 17, the air-conditioning ECU 5 determines whether the one-seat concentration switch 71 receives a signal indicative of the on-state, or not, in S400. In S400, when the air-conditioning ECU 5 receives the signal of the on-state, the determination result is YES, and when the air-conditioning ECU 5 does not receive the signal of the on-state, the determination result is NO.

If the determination is NO in S400, the air-conditioning ECU 5 executes a process of decreasing the air-conditioning output of the heating operation to all of the seats in the vehicle compared with when the energization disable state is set, in S401. A reduction in the air-conditioning output can be implemented by decreasing the outlet air temperature and the outlet air volume into the vehicle interior more than those when the energization disable state is set. Therefore, in the case of that determination result, the air-conditioning ECU 5 decreases the outlet air temperature and the outlet air volume into the vehicle interior compared with when the energization disable state is set under the control, completes the present flowchart, returns to S10 in FIG. 6, and repetitively executes the subsequent respective processes.

If the determination is YES in S400, the air-conditioning ECU 5 executes a process of decreasing the air-conditioning output of the heating operation to the seats other than a specific seat (concentration setting seat) set by the one-seat concentration switch 71 compared with when the energization disable state is set in S402. Therefore, because the specific seat is set as the air-conditioning priority seat in S402, the air-conditioning output of the heating operation is not decreased. For example, when the specific seat is set at the driver seat, no occupant is present on the other front passenger seat and rear seats, or much heating capacity is not required. Therefore, the air-conditioning ECU 5 decreases the air-conditioning output for the other seats compared with when the energization disable state is set. After the execution of the processing in S402, the air-conditioning ECU 5 completes the present flowchart, returns to S10 in FIG. 6, and repetitively executes the subsequent respective processes.

As described above, when the energization enable state is set, and when the specific seat mode for prioritizing the air-conditioning of the predetermined seat is set, the air-conditioning ECU 5 decreases the air-conditioning output of the heating operation of the seats other than the predetermined seat. The air-conditioning ECU 5 may stop the heating operation to decrease the air-conditioning output of the heating operation more than when the energization disable state is set in S402.

When the specific seat mode is set in the energization enable state, the control according to the third embodiment decreases the air-conditioning output to only the seats other than the specific seat. As a result, the normal air-conditioning capacity is ensured for the seat designated by the occupant, that is, the seat requiring the heating capacity, and unnecessary air-conditioning can be reduced for the other seats. Therefore, according to the control of the third embodiment, the radiant heater air-conditioning system satisfies the heating request from the occupant, and does not require the unnecessary capacity of the total output from the heating portion 11 and the air-conditioning apparatus.

When the specific seat mode is set in the energization enable state, and when the radiant heat is radiated from the device 1 toward the specific seat, the air-conditioning ECU 5 may decrease the air-conditioning output to the specific seat compared with in the energization disable state. According to the above configuration, because the radiant heat by the heater is provided to the specific seat, the air-conditioning capacity can be reduced while the heating feeling is ensured.

When the specific seat mode is set in the energization enable state, and when the radiant heat is radiated from the device 1 toward the specific seat, the air-conditioning ECU 5 may decrease the air-conditioning output to the specific seat and at least one of seats other than the specific seat compared with in the energization disable state.

Fourth Embodiment

Figure 18:
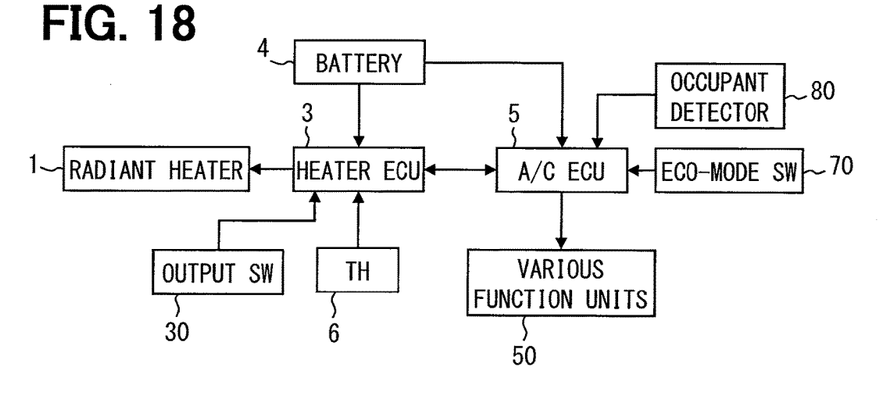
FIG. 18 is a block diagram illustrating a radiant heater air-conditioning system according to a fourth embodiment.
Figure 19:
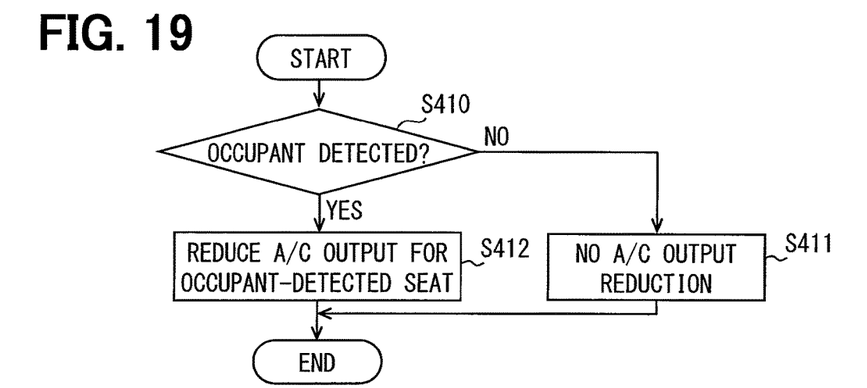
FIG. 19 is a flowchart illustrating a process and control for reducing an air-conditioning capacity according to the fourth embodiment.

A radiant heater air-conditioning system according to a fourth embodiment will be described with reference to FIGS. 18 and 19. In the fourth embodiment, components denoted by the same symbols as those in the drawings according to the first and second embodiments and configurations not described are identical with those in the first and second embodiments, and the same advantages are obtained.

The radiant heater air-conditioning system according to the fourth embodiment is different from the system of the second embodiment in that an occupant detection unit 80 that can detect that the occupant is present in a predetermined seat is further provided. The occupant detection unit 80 may be provided by various means. For example, the occupant detection unit 80 can be provided by a weight sensor or a seat belt sensor. The occupant detection unit 80 can be provided by the one-seat concentration switch 71 described in the third embodiment. In that case, when the one-seat concentration switch 71 becomes in the on-state, it is assumed that the occupant is present on the specific seat.

The weight sensor detects a load exerted on a predetermined seat, and outputs a signal for detecting the presence of the occupant to the air-conditioning ECU 5 when the load of a predetermined value or more is detected. The seat belt sensor outputs a wearing signal to the air-conditioning ECU 5 when a seat belt of the seat is used at the predetermined seat. Upon receiving the wearing signal, the air-conditioning ECU 5 detects that the occupant is present on the predetermined seat.

Subsequently, the air-conditioning capacity reduction control (S40) in FIG. 6 will be described. FIG. 19 illustrates a flowchart of the air-conditioning capacity reduction control. As illustrated in FIG. 19, the air-conditioning ECU 5 determines whether the occupant is detected by the occupant detection unit, or not, in S410. In S410, if the occupant is detected, the determination is YES, and if no occupant is detected, the determination is NO.

If the determination is NO in S410, the air-conditioning ECU 5 executes a process of providing the normal air-conditioning capacity without decreasing the air-conditioning output of the heating operation to all of the seats, in S411. The air-conditioning ECU 5 completes the present flowchart, returns to S10 in FIG. 6, and repetitively executes the subsequent respective processes.

If the determination is YES in S410, the air-conditioning ECU 5 executes a process of decreasing the air-conditioning output of the heating operation to the detected seat on which the occupant is detected by the occupant detection unit, compared with when the energization disable state is set in S412. A reduction in the air-conditioning output can be implemented by decreasing the outlet air temperature and the outlet air volume into the vehicle interior more than those when the energization disable state is set. When the device 1 is not provided in the seat on which the occupant is detected, because radiant heat is not radiated, the air-conditioning output is not decreased exceptionally.

Therefore, the air-conditioning output of the heating operation is decreased for the seat on which the occupant is present among all of the seats in the vehicle in S412. After the execution of the processing in S412, the air-conditioning ECU 5 completes the present flowchart, returns to S10 in FIG. 6, and repetitively executes the subsequent respective processes. As described above, when a signal for detecting the presence of the occupant by the occupant detection unit is input, and when the energization enable state is set, the air-conditioning ECU 5 decreases the air-conditioning output of the heating operation to the seat on which the occupant is detected, compared with when the energization disable state is set, under the control. The air-conditioning ECU 5 may stop the heating operation to decrease the air-conditioning output of the heating operation, compared with when the energization disable state is set in S412.

When the occupant is detected in the energization enable state, the control according to the fourth embodiment decreases the air-conditioning output to the occupant detection seat. With the above configuration, skin dry caused by providing the excess heating to the seat on which the occupant is present is prevented, and the unnecessary air-conditioning can be reduced. Therefore, according to the control of the fourth embodiment in the radiant heater air-conditioning system, the total output from the heating portion 11 and the air-conditioning apparatus does not become an unnecessary capacity.

When the energization enable state is set, when the presence of the occupant is detected, and when the radiant heat from the device 1 is radiated toward the occupant detection seat, the air-conditioning ECU 5 may decrease the air-conditioning output to the seats other than the occupant detection seat.

When the energization enable state is set, when the presence of the occupant is detected, and when the radiant heat from the device 1 is radiated toward the occupant detection seat, the air-conditioning ECU 5 may decrease the air-conditioning output to the occupant detection seat and the other seats.

Fifth Embodiment

Figure 20:
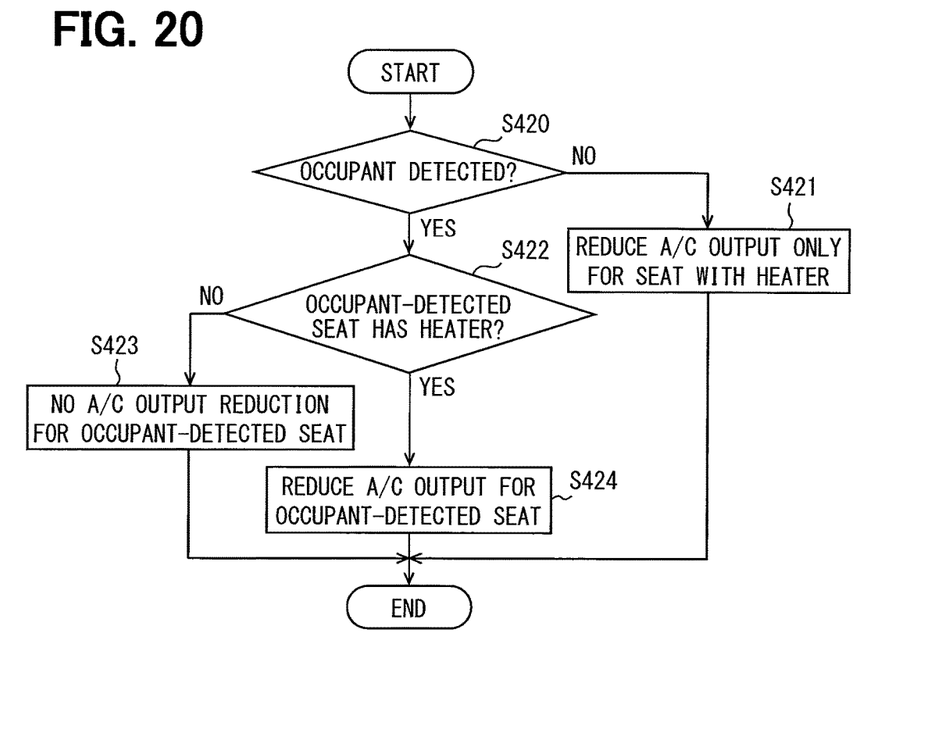
FIG. 20 is a flowchart illustrating a process and control for reducing an air-conditioning capacity according to a fifth embodiment.

A radiant heater air-conditioning system according to a fifth embodiment will be described with reference to FIG. 20. The fifth embodiment is the same as the fourth embodiment except for the features described below.

Subsequently, the air-conditioning capacity reduction control (S40) in FIG. 6 will be described. FIG. 20 illustrates a flowchart of the air-conditioning capacity reduction control. As illustrated in FIG. 20, the air-conditioning ECU 5 determines whether an occupant is detected by the occupant detection unit, or not, in S420. In S420, if the occupant is detected, the determination is YES, and if no occupant is detected, the determination is NO.

If the determination is NO in S420, the air-conditioning ECU 5 executes a process of decreasing the air-conditioning output of the heating operation, among all of the seats in the vehicle, to the seat to which the radiant heat is supplied by the device 1 and/or the seat in which the device 1 is installed in S421. The air-conditioning ECU 5 completes the present flowchart, returns to S10 in FIG. 6, and repetitively executes the subsequent respective processes. The air-conditioning ECU 5 may stop the heating operation in S421.

If the determination is YES in S420, the air-conditioning ECU 5 determines whether the device 1 is installed in the seat on which the occupant is detected, or not, in next S422. If the device 1 is installed, the determination is YES, and if the device 1 is not installed, the determination is NO, in S422.

If the determination is NO in S422, the air-conditioning ECU 5 executes a process of providing the normal air-conditioning capacity without decreasing the air-conditioning output of the heating operation to the occupant detection seat, in S423. The air-conditioning ECU 5 completes the present flowchart, returns to S10 in FIG. 6, and repetitively executes the subsequent respective processes.

If the determination is YES in S422, the air-conditioning ECU 5 executes a process of decreasing the air-conditioning output of the heating operation to the occupant detection seat, in S424. The air-conditioning ECU 5 completes the present flowchart, returns to S10 in FIG. 6, and repetitively executes the subsequent respective processes. A reduction in the air-conditioning output can be implemented by decreasing the outlet air temperature and the outlet air volume into the vehicle interior more than those when the energization disable state is set.

As described above, when the energization enable state is set, when the presence of the occupant is detected by the occupant detection unit, and when the device 1 is installed in the occupant detection seat, the air-conditioning ECU 5 decreases the air-conditioning output of the heating operation to the seat on which the occupant is detected, compared with when the energization disable state is set, under the control. The air-conditioning ECU 5 may stop the heating operation to decrease the air-conditioning output of the heating operation more than when the energization disable state is set in S424.

When the device 1 is installed in the seat on which the occupant is detected in the energization enable state, the control according to the fifth embodiment decreases the air-conditioning output to the occupant detection seat. With the above configuration, unnecessary air-conditioning can be reduced for the seat on which the occupant is present, and toward which the radiant heat is radiated. Therefore, according to the control of the fifth embodiment, the control can be performed so that the air-conditioning capacity to be provided is distinguished between the seat toward which the radiant heat is radiated, and the seat toward which the radiant heat is not radiated. The occupant does not suffer from skin dry caused by providing excess heating, and the control is performed to match the heating feeling. With the radiant heater air-conditioning system, the total output from the heating portion 11 and the air-conditioning apparatus does not become an unnecessary capacity.

When the energization enable state is set, the air-conditioning ECU 5 decreases the air-conditioning output of the heating operation to the seat toward which the radiant heat from the device 1 is radiated, and does not decrease the air-conditioning output of the heating operation to the seat toward which the radiant heat from the device 1 is not radiated. According to the above configuration, the control can be performed so that a difference in the air-conditioning capacity is provided between the seat in which the device 1 is installed and the seat in which the device 1 is not installed, and the heating feeling can be suitably provided for the respective occupant on each seat.

Other Embodiments

Hereinbefore, the preferred embodiments of the invention disclosed have been described. However, the disclosed invention is not limited to the embodiments described above and can be realized in various modifications.

The structures of the above embodiments are merely exemplary, and technical scopes of the disclosed invention are not limited to the disclosed scopes. The technical scope of the disclosed invention is represented by the claims, and includes meanings equivalent to those of the claims, and all changes in the scope.

In the above embodiments, the heater ECU 3 is a control device configured to communicate with the air-conditioning ECU, and separated from the air-conditioning ECU. For example, the heater ECU 3 may be a shared control device integrated with the air-conditioning ECU.

What is claimed is:

1. A radiant heater air-conditioning system comprising:
a heater main body having a heating portion energized to generate heat so as to radiate a radiant heat into a vehicle interior;
an energization setting unit that sets an energization enable state for enabling energization of the heating portion and an energization disable state for disabling the energization of the heating portion;
an air-conditioning control apparatus that controls an air-conditioning output of a heating operation in the vehicle interior;
a specific seat switch operated to set a specific seat mode for performing air-conditioning on a predetermined seat preferentially, the specific seat switch includes a one-seat concentration switch operated by an occupant to set one of a front driver seat, a front passenger seat, and rear seats as the predetermined seat, wherein
the air-conditioning control apparatus reduces the air-conditioning output when the energization enable state is set, compared with when the energization disable state is set, and
the air-conditioning control apparatus reduces the air-conditioning output to a seat other than the predetermined seat when the energization enable state is set and when the specific seat mode is set, compared with when the energization disable state is set.

2. The radiant heater air-conditioning system according to claim 1, wherein
the air-conditioning control apparatus reduces an amount of conditioned-air blown into the vehicle interior when the energization enable state is set, compared with when the energization disable state is set.

3. The radiant heater air-conditioning system according to claim 1, wherein
the air-conditioning control apparatus lowers an outlet temperature of conditioned-air blown into the vehicle interior when the energization enable state is set, compared with when the energization disable state is set.

4. The radiant heater air-conditioning system according to claim 1, wherein
the air-conditioning control apparatus stops air-conditioning operation when the energization enable state is set.

5. The radiant heater air-conditioning system according to claim 1, wherein
the air-conditioning control apparatus changes a reduced amount of the air-conditioning output according to an output of the heater main body when the energization enable state is set.

6. The radiant heater air-conditioning system according to claim 1, further comprising an eco-mode switch operated for setting a power saving mode, wherein
the air-conditioning control apparatus increases a reduced amount of the air-conditioning output when the energization enable state is set and when the power saving mode is set, compared with when the energization enable state is set and when the power saving mode is not set.

7. The radiant heater air-conditioning system according to claim 1, wherein
the air-conditioning control apparatus reduces the air-conditioning output to a seat toward which the radiant heat from the heater main body is radiated, and does not reduce the air-conditioning output to a seat toward which the radiant heat from the heater main body is not radiated when the energization enable state is set.

8. The radiant heater air-conditioning system according to claim 1, further comprising an occupant sensor to detect an occupant present in the predetermined seat, wherein
the occupant sensor is different from the one-seat concentration switch operated by the occupant,
the air-conditioning control apparatus determines whether the heating portion is installed in the predetermined seat when the occupant sensor detects the occupant, and
when the heating portion is installed in the predetermined seat, the air-conditioning control apparatus reduces the air-conditioning output to the predetermined seat.

9. A radiant heater air-conditioning system comprising:
a heater main body having a heating portion energized to generate heat so as to radiate a radiant heat into a vehicle interior;
an energization setting unit that sets an energization enable state for enabling energization of the heating portion and an energization disable state for disabling the energization of the heating portion;
an air-conditioning control apparatus that controls an air-conditioning output of a heating operation in the vehicle interior; and
a specific seat switch operated to set a specific seat mode for performing air-conditioning on a predetermined seat preferentially, the specific seat switch includes a one-seat concentration switch operated by an occupant to set one of a front driver seat, a front passenger seat, and rear seats as the predetermined seat, wherein
the air-conditioning control apparatus reduces the air-conditioning output when the energization enable state is set, compared with when the energization disable state is set, and
the air-conditioning control apparatus reduces the air-conditioning output to the predetermined seat and at least one of seats other than the predetermined seat when the energization enable state is set, when the specific seat mode is set, and when the radiant heat from the heater main body is radiated toward the predetermined seat, compared with when the energization disable state is set.

10. The radiant heater air-conditioning system according to claim 9, wherein
the air-conditioning control apparatus reduces an amount of conditioned-air blown into the vehicle interior when the energization enable state is set, compared with when the energization disable state is set.

11. The radiant heater air-conditioning system according to claim 9, wherein
the air-conditioning control apparatus lowers an outlet temperature of conditioned-air blown into the vehicle interior when the energization enable state is set, compared with when the energization disable state is set.

12. The radiant heater air-conditioning system according to claim 9, wherein
the air-conditioning control apparatus stops air-conditioning operation when the energization enable state is set.

13. The radiant heater air-conditioning system according to claim 9, wherein
the air-conditioning control apparatus changes a reduced amount of the air-conditioning output according to an output of the heater main body when the energization enable state is set.

14. The radiant heater air-conditioning system according to claim 9, further comprising an eco-mode switch operated for setting a power saving mode, wherein
the air-conditioning control apparatus increases a reduced amount of the air-conditioning output when the energization enable state is set and when the power saving mode is set, compared with when the energization enable state is set and when the power saving mode is not set.

15. The radiant heater air-conditioning system according to claim 9, wherein
the air-conditioning control apparatus reduces the air-conditioning output to a seat toward which the radiant heat from the heater main body is radiated, and does not reduce the air-conditioning output to a seat toward which the radiant heat from the heater main body is not radiated when the energization enable state is set.

16. The radiant heater air-conditioning system according to claim 9, further comprising an occupant sensor to detect an occupant present in the predetermined seat, wherein
the occupant sensor is different from the one-seat concentration switch operated by the occupant,
the air-conditioning control apparatus determines whether the heating portion is installed in the predetermined seat when the occupant sensor detects the occupant, and
when the heating portion is installed in the predetermined seat, the air-conditioning control apparatus reduces the air-conditioning output to the predetermined seat.

* * * * *